(12) United States Patent
Haas

(10) Patent No.: US 7,808,896 B2
(45) Date of Patent: Oct. 5, 2010

(54) DATA PATH-BASED SERVICE DEPLOYMENT IN HIERARCHICAL NETWORKS

(75) Inventor: Robert Haas, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1763 days.

(21) Appl. No.: 10/824,665

(22) Filed: Apr. 14, 2004

(65) Prior Publication Data

US 2004/0190456 A1 Sep. 30, 2004

(51) Int. Cl.
*H04J 3/14* (2006.01)
*H04L 12/28* (2006.01)
*H04J 1/16* (2006.01)

(52) U.S. Cl. .................. 370/230; 370/238; 370/254

(58) Field of Classification Search ................ 370/238, 370/238.1, 230.1, 231, 395.31, 395.21, 400, 370/422, 428, 392
See application file for complete search history.

(56) References Cited

U.S. PATENT DOCUMENTS

| | | | | |
|---|---|---|---|---|
| 5,483,522 A | * | 1/1996 | Derby et al. ................. | 370/400 |
| 6,522,627 B1 | * | 2/2003 | Mauger ....................... | 370/230 |
| 6,597,658 B1 | * | 7/2003 | Simmons ..................... | 370/221 |
| 6,647,008 B1 | * | 11/2003 | Galand et al. ............... | 370/389 |
| 6,842,463 B1 | * | 1/2005 | Drwiega et al. ............. | 370/468 |
| 6,934,249 B1 | * | 8/2005 | Bertin et al. ................. | 370/218 |
| 7,065,045 B2 | * | 6/2006 | Jeffries et al. ............... | 370/230 |
| 7,130,262 B1 | * | 10/2006 | Cortez et al. ................ | 370/216 |
| 7,180,866 B1 | * | 2/2007 | Chartre et al. .............. | 370/242 |
| 7,254,138 B2 | * | 8/2007 | Sandstrom ................... | 370/412 |

* cited by examiner

*Primary Examiner*—Pankaj Kumar
*Assistant Examiner*—Marcus R Smith
(74) *Attorney, Agent, or Firm*—Scully, Scott, Murphy & Presser, P.C.; Kenneth R. Corsello, Esq

(57) ABSTRACT

Provides optimizing a data path and forwarding a data from a start node to an end node over a network, wherein the data is forwarded through the data path which is determined by a data path option having a minimum overall capacity regarding first capacity values. Provides a first capacity value for a specific first node and for a specific first node function including determining a number of second data path options for the second nodes of the specific first node to perform the specific first node function, for each second data path option, the second nodes having one or more assigned second node functions. Provides a second capacity values for each of the second nodes and for each of the assigned second node functions, and determines overall capacity values of the nodes and for each of the assigned second node functions.

8 Claims, 5 Drawing Sheets

$T_{U0}$ : $T_{B0}$ $T_{U(E1)}$ : $T_{B0} \rightarrow T_{A(E1)} \rightarrow T_{B0} \rightarrow$ ; $T_{B(E1)}$ $T_{U(E2)}$ : $T_{B0} \rightarrow T_{A(E2)} \rightarrow T_{B0} \rightarrow$ ; $T_{B(E2)}$ $T_{U(E1, E2)}$ : $T_{B(E1)} \rightarrow T_{A(E2)} \rightarrow T_{B0}$ ; $T_{B0} \rightarrow T_{A(E1)}$
$\rightarrow T_{B(E2)}$ ; $T_{B0} \rightarrow T_{A(E1, E2)} \rightarrow T_{B0}$ ; $T_{B(E1,E2)}$ $T_{V0}$ : $T_{C0}$ $T_{V(E1)}$ : $T_{C0} \rightarrow T_{D(E1)} \rightarrow T_{C0}$ ; $T_{C(E1)}$ $T_{V(E2)}$ : $T_{C0} \rightarrow T_{D(E2)} \rightarrow T_{C0}$ ; $T_{C(E2)}$ $T_{V(E1, E2)}$ : $T_{C(E1)} \rightarrow T_{D(E2)} \rightarrow T_{C0}$ ; $T_{C0} \rightarrow T_{D(E1)}$
$\rightarrow T_{C(E2)}$ ; $T_{C0} \rightarrow T_{D(E1, E2)} \rightarrow T_{C0}$ ; $T_{C(E1,E2)}$

Fig. 4

DATA PATH-BASED SERVICE DEPLOYMENT IN HIERARCHICAL NETWORKS

FIELD OF INVENTION

The present invention relates to hierarchical networks, particularly for forwarding data through a network providing data path functions.

BACKGROUND OF THE INVENTION

Besides, basic packet forwarding from a start node to an end node of a network, data path functions have recently been provided. While being forwarded from node to node of the network, data is processed according to given service-related functions. This has become possible thanks to programmable data path processors, evolved specialized coprocessors etc. The number and type of such data path functions which are scattered over network nodes is growing rapidly with the deployment of new equipment.

In these new developments, forwarding and transforming data is related to a service. The service is provided by one or more functions which are applied to the data flowing through the network. In order to provide a useful service, the functions applied to the data must be executed in nodes of the network, wherein the data is transmitted through the nodes in a specifically optimized manner.

Increasingly, the service depends on specific customer needs and requires a certain number of functions, the combination of which is not known a priori. As performing these functions requires different capacities within different nodes, the need to optimize the distribution and usage of such functions within the network nodes is coming more and more into focus.

Especially the complexity introduced by the growing number of network nodes mainly in hierarchical networks and the increasing variety of functions to be provided to the forwarded data is complicating the optimization of the usage of the service within the network.

SUMMARY OF THE INVENTION

Therefore, it is an aspect of the present invention to optimize usage of network nodes in a large and heterogeneous network, regarding the service to be applied to the forwarded data.

It is a further aspect of the present invention to provide a method for forwarding data from a start node to an end node over a hierarchical network.

It is a still further aspect of the present invention that the method can be performed automatically and be independent of the type of function it assigns to the respective node.

These aspects are obtained by a method for forwarding data from a start node to an end node over a network, a router device and a network node.

In an example embodiment of the present invention, a method for forwarding data from a start node to an end node over a network is provided. The network comprises first nodes, each being capable of performing one or more first node functions. One or more of the first node functions are to be applied to the data while forwarding the data through the network. A number of data path options for the first nodes are determined for each data path option, the first node having one or more assigned first node functions. A first capacity value for each of the first nodes and for each of the first node functions and/or combinations of the first node functions are provided. Data is forwarded through the data path which is determined by the data path option having a first minimum overall capacity regarding the first capacity values. The one or more of the first nodes comprise one or more second nodes, each of the second nodes assigned to one of the first nodes is capable of performing one or more second node functions. The first node functions of the first nodes are provided by the second node functions.

A method of the present invention has the advantage that the usage of nodes and functions can be optimized in a network having hierarchical layers. The optimization is independent of the type of service which has to be applied to the forwarded data and therefore individual services including different functions can be executed with forwarded data.

In another aspect of the present invention, a router device is provided to determine a data path from the start node to an end node over a network. The network comprises first nodes, each capable of performing one or more first node functions. One or more of the first node functions are to be applied to the data while forwarding the data through the network. One or more of the first nodes comprise one or more second nodes wherein each of the second nodes assigned to one of the first nodes is capable of performing one or more second node functions. The first node functions of the first nodes are provided by the one or more second node functions.

According to another aspect of the present invention a network node is provided. The network node includes one or more subnodes each being able to execute one or more functions wherein a subnode capacity value is assigned to each subnode and to each function related to the respective subnode. The network node further comprises a request receiving means to receive a request for providing overall capacity values related to a set of one or more specific functions executed by the network node. A data path determining means is further provided to determine a number of data path options for each of the functions of the set of one or more specific functions to be executed by the network node. A capacity determining means is provided to determine an overall capacity value for each of the data path options and for each of the functions of the set of one or more specific functions to be performed in the network node, wherein the overall capacity values of each data path option are determined with regard to the subnode capacity values provided for each of the subnodes and for each of the assigned specific functions. A minimum overall capacity value is transmitted by transmitting means for each of the specific functions of the set of one or more specific functions and for the assigned data path option as the requested overall capacity value.

BRIEF DESCRIPTION OF THE DRAWINGS

The invention and its embodiments will be more fully appreciated by reference to the following detailed description of advantageous and illustrative embodiments in accordance with the present invention when taken in conjunction with the accompanying drawings, in which:

FIG. 3 shows a table indicating possible data path options for the upper layer of the network according to FIG. 1;

FIG. 4 shows a table of all data path options for each possible node-function-pair according to the determined data path option.

DETAILED DESCRIPTION OF THE INVENTION

Figure 1:
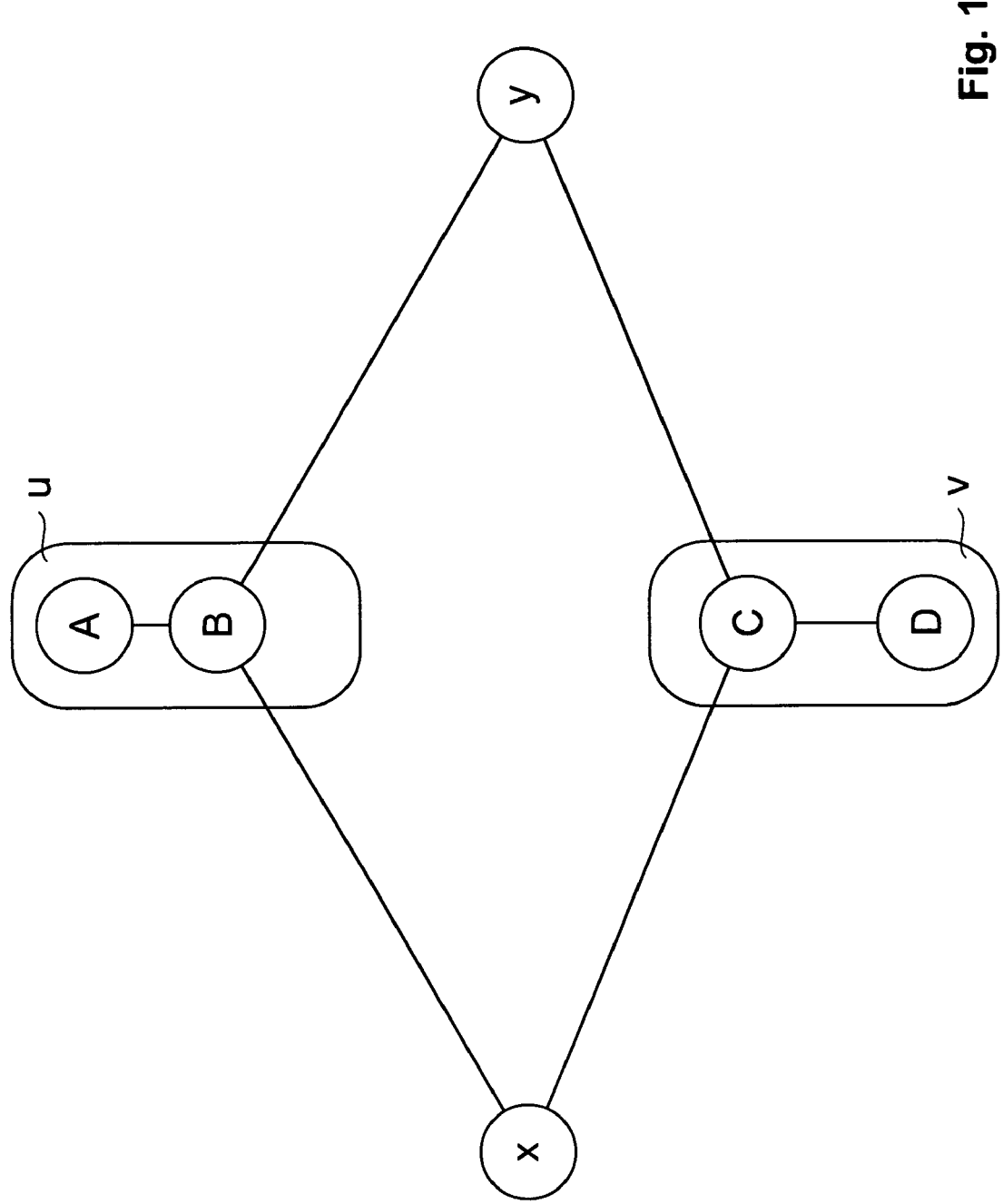
FIG. 1 shows a schematic view of a conventional two-layer hierarchical network.

The present invention provides methods, apparatus and systems to optimize the usage of network nodes in a large and heterogeneous network, regarding the service to be applied to the forwarded data. It is a further object of the present invention to provide a method for forwarding data from a start node to an end node over a hierarchical network. Generally, the method can be performed automatically and is independent of the type of function it assigns to the respective node.

The present invention provides a method for forwarding data from a start node to an end node over a network. The network comprises first nodes, each capable of performing one or more first node functions. One or more of the first node functions are to be applied to the data while forwarding the data through the network. A number of data path options for the first nodes are determined for each data path option, the first node having one or more assigned first node functions. A first capacity value for each of the first nodes and for each of the first node functions and/or combinations of the first node functions are provided. Data is forwarded through the data path which is determined by the data path option having a first minimum overall capacity regarding the first capacity values. The one or more of the first nodes comprise one or more second nodes, each of the second nodes assigned to one of the first nodes is capable of performing one or more second node functions. The first node functions of the first nodes are provided by the second node functions.

Provision of one of the first capacity values for one specific first node and for one specific first node function and/or one specific combination of the first node functions is performed by determining a number of second data path options for the second nodes of the one specific first node to perform the one specific first node function. For each second data path option the second nodes include one or more assigned second node functions. Second capacity values for each of the second nodes and for each of the assigned second node functions are provided. A second minimum overall capacity value of any of the second data path options are determined with regard to the second capacity values and is provided as the first capacity value of the one specific first node.

The method of the present invention has the advantage that the usage of nodes and functions can be optimized in a network having hierarchical layers. The optimization is independent of the type of service which has to be applied to the forwarded data and therefore individual services including different functions can be executed with forwarded data.

This is achieved by establishing a cascaded optimization method which first determines possible paths through the network nodes where in each possible path option none, one or more respective functions are assigned to each first node. As a second step, each of the determined data path options is associated with an overall capacity value wherein the data path option with the minimum overall capacity value determines the data path of the data to be forwarded through the network. As the capacity values can only clearly be determined for executed functions in physical network nodes, all data path options in the network down to the network layer of the physical nodes have to be determined first.

Then, starting with the second nodes for each of the second data path options, a second overall capacity value is determined whereby the minimum overall capacity value of all second data path options is provided as the respective capacity value for the first node and the first function related thereto. Consequently, for each of the first nodes a set of first capacity values is calculated, wherein the set of first capacity values includes first capacity values for each of the possible first node function in this first node given by the first data path option. Thus, a cascaded data path optimization method is provided for a hierarchical network wherein the function-dependent processing capacity of the physical nodes of the lowest network layer can be considered.

The present invention also provides a router device to determine a data path from the start node to an end node over a network. The network comprises first nodes, each capable of performing one or more first node functions. One or more of the first node functions are to be applied to the data while forwarding the data through the network. One or more of the first nodes comprise one or more second nodes wherein each of the second nodes assigned to one of the first nodes is capable of performing one or more second node functions. The first node functions of the first nodes are provided by the one or more second node functions.

The router device comprises a first data path determining means to determine a number of data path options for the first nodes for each data path option, each of the first nodes having one or more assigned first node functions. It further includes a first means for determining the minimum overall capacity value of any of the first data path options regarding the first capacity values for each of the first nodes and for each of the first node functions and/or combinations of the first node functions. The first capacity values for each of the first nodes and for each of the first node functions and/or combinations of the first node functions are received by receiving means. It is preferred that the router device further include a request transmitting means for sending a request for first capacity values for each of the first nodes and for each of the first node functions and/or combinations of the first node functions to each of the first nodes.

A router device according to the present invention has the advantage that data can be forwarded through a network via a predetermined data path from a start node to an end node and transformed according to a service by one or more implemented functions in an optimized manner related to the respective function that should be applied to the data. Thus controlled by the router, data is forwarded through the predetermined data path according to the specific function which should be applied to the data, so that the data path of each data packet associated to a specific service is predetermined in relation to the functions to be applied before transmitting the data packets. In this way, a minimum of capacity of each node is used. Thereby, it can be advantageously achieved that the network load caused by the forwarding of the data is minimized so that a maximum of capacity can be spared to be used by other data to which the same or other functions are to be applied.

In some embodiments, if the second nodes are physical nodes, the capacity values are dependent on at least one of the following factors as a data processing speed, a data handling speed, a buffering capacity relating to the assigned second node functions and the resources available, such as free memory, processing time etc. Thereby, second capacity values are associated to any of the second nodes and to each of the second node functions which can be performed within the respective second node and are related to the capability of performing the respective second node function with regard to the use of the system resources.

The present invention further provides a network node. The network node includes one or more subnodes each being able to execute one or more functions wherein a subnode capacity value is assigned to each subnode and to each function related to the respective subnode. The network node further comprises a request receiving means to receive a request for providing overall capacity values related to a set of one or more specific functions executed by the network node. A data path determining means is further provided to determine a number of data path options for each of the functions of the set of one or more specific functions to be executed by the network node. A capacity determining means is provided to determine an overall capacity value for each of the data path options and for each of the functions of the set of one or more specific functions to be performed in the network node, wherein the overall capacity values of each data path option are determined with regard to the subnode capacity values provided for each of the subnodes and for each of the assigned specific functions. A minimum overall capacity value is transmitted by transmitting means for each of the specific functions of the set of one or more specific functions and for the assigned data path option as the requested overall capacity value.

The network node of the present invention has the advantage that it is able to provide requested capacity values for performing one or more specific functions in the network node. The capacity values are requested by a router device which determines the complete data path for a data flow through the network wherein a service shall be provided to the data. As the router device has not the knowledge of the hierarchical topology of the network node information about capacity to perform a specific function can be requested from the network node. To determine the optimized data path the router device has to request capacity values for a set of specific functions able to be executed in the network node. For each of the requested functions data path options are determined and the minimum capacity value of the best data path option is transmitted to the router device, respectively.

For a better understanding of the present invention, together with other further features and advantages thereof, reference is made to the following description taken in conjunction with the accompanying drawings and the scope of the invention that will be pointed out in the appended claims. With reference to FIG. 1, a schematic view of a hierarchical network that is used with the present invention is depicted. The hierarchical network includes a start node X from which a data packet is sent and an end node Y where the data packet transformed by functions is received. The transformed data packet is data to which a service is applied. The start node X is connected to the end node Y via a network including the first logical node U and a second logical node V. The first logical node U is connected to the start node X, the end node Y and the second logical node V. The second logical node V has a connection to the start node X, the end node Y and the first logical node U.

Each of the first and the second logical nodes U, V includes a sub-network having physical nodes the topology of which is most probably not known by the start node X. The first logical node U includes a first physical node A and a second physical node B, and the second logical node V includes a third physical node C and a fourth physical node D. The first to fourth physical nodes represent a hardware designed to forward data and to transform data using one or more element functions $E_1$, $E_2 \ldots E_i$ according to a service to be applied to the data.

The element functions $E_1$, $E_2 \ldots E_i$ operate on data packets and can include for example:
Encryption/decryption
signing/authentication
encapsulation/de-capsulation
compression/de-compression
multiplexing/de-multiplexing
reordering
transcoding
filtering
content-based forwarding
QOS-treatment (Quality of Service)
Active network execution
Integrity check (checksum)
replication Therefore, a service is defined as a composition of element functions $E_1$, $E_2 \ldots E_i$ scattered at various nodes in the network. For example, users of a mobile device with a low-band width link will benefit from a service the functions of which are placed at key locations between the mobile device and a video server, so that the data is transcoded and reordered before it is received by the mobile device. To give another example, an ad hoc virtual private network will require a set of filtering and encryption/decryption functions deployed between the sub-networks that have to be interconnected.

A service is considered that requires element functions to be executed at certain nodes in the network through which the data is forwarded. To optimize the service deployment, an automated assignment of the element functions $E_1$, $E_2 \ldots E_i$ to a specific node in the network has to be performed. As each element function $E_1$, $E_2 \ldots E_i$ incurs a capacity usage in a physical node when it is executed also performing the element functions in the logical nodes incurs a capacity usage. The optimization process according to the present invention provides a method to find the nodes in the network that will execute the element functions with the lowest capacity usage.

In the following it is assumed that the service as is described as K element functions $E_i$ where $0 \leq i < K$, each $E_i$ having a capacity usage defined by a capacity value $C_{i(n)}$, when it is executed on node n, where n={A, B, C, D, U, V}. It is possible that the element functions $E_1$, $E_2 \ldots E_i$ have a strict order, i.e. a path must traverse nodes performing the element functions in the given order. For example, $E_i$ must be executed before $E_{i+1}$ where $0 \leq i < K-1$. Whether the element functions have a strict order or not is defined by the service S.

Figure 2:
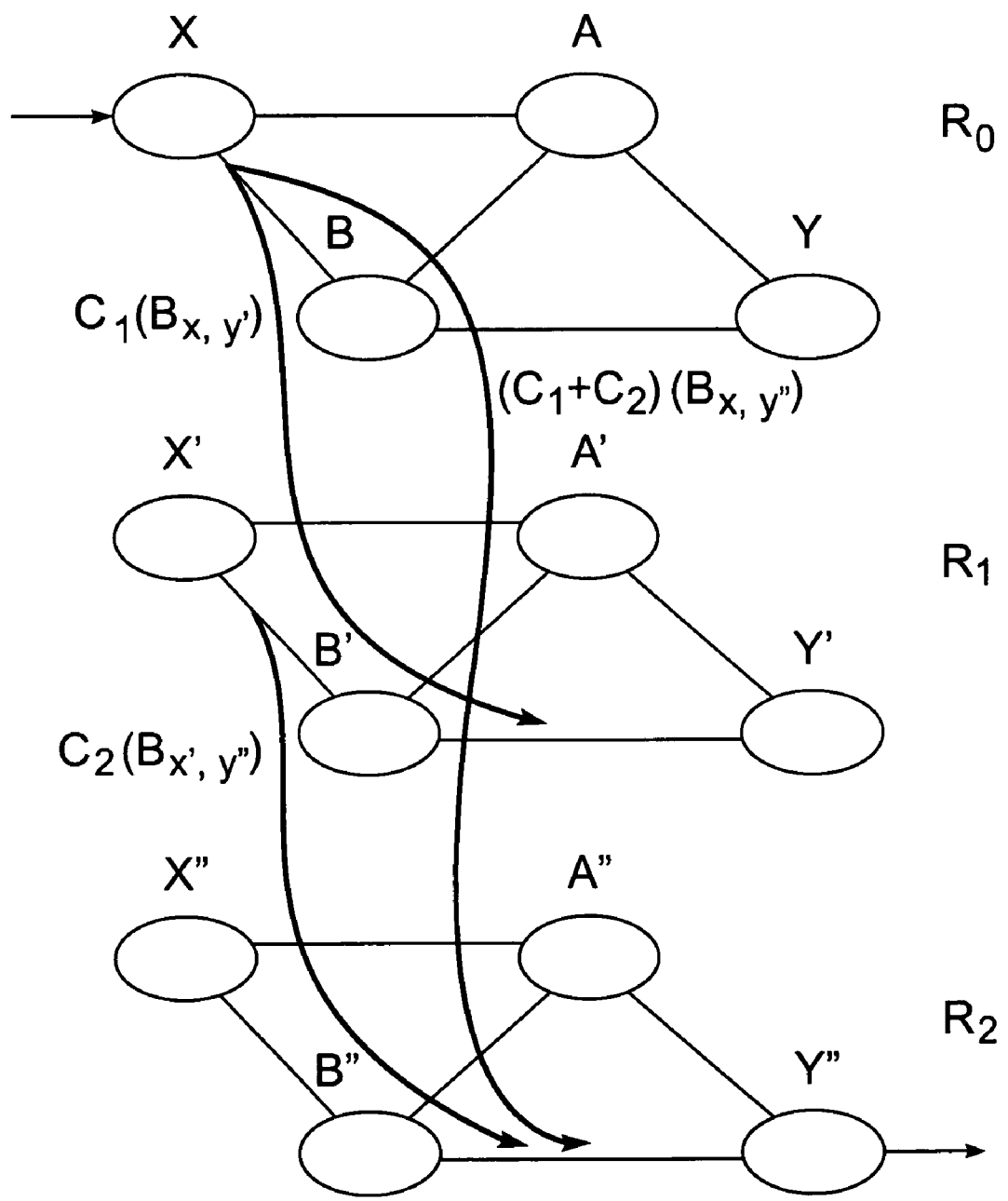
FIG. 2 illustrates a simple mechanism to find a shortest path through a network.

For flat networks, the shortest path through the network can be found by virtually replicating the original flat network as often as there are element functions E and adding directed edges to account for the capacity values $C_{i(n)}$ of executing the element function $E_1$, $E_2 \ldots E_i$ between the node n in replica $R_i$ and the same node in replica $R_i+1$, where $0 \leq i < K$. This is shown in FIG. 2.

For a hierarchical network, the above mechanism is not sufficient as it does not account for the nodes being logical nodes and not physical nodes, as for logical nodes no capacity values are previously known or can be determined by system constraints. Logical nodes provide metrics describing the capacity usage of executing element functions $E_1$, $E_2 \ldots E_i$ and combinations thereof in the underlying peer group they represent. In a first step it has to be determined, which element functions $E_1$, $E_2 \ldots E_i$ and combinations thereof are relevant in which logical nodes. For the network shown in FIG. 1 and a service S indicating a data that has to be forwarded from the start node X to the end node Y and indicating that the element functions $E_1$ and $E_2$ are to be applied to the data, the number of data path options through the logical nodes can be determined to assign each of the first and second logical nodes U, V to none, one of the element functions $E_1$, $E_2$ or both of them.

The table shown in FIG. 3 shows the possible data path options for the service $S(E_1, E_2)$ being performed wherein the data packet is transmitted from the start node X to the end node Y and where in between the element functions $E_1$, $E_2$ are to be applied to the data packet in the correct order. In the table according to FIG. 3, T is the transition matrix indicating the function which is applied to the data packet while forwarding to the next node, where $T_U$ is the transition matrix, for the first logical node U and $T_V$ is the transition matrix for the second logical node V. The subscript $E_1$ means that the transition matrix T is for a logical node which performs the first element function $E_1$; the subscript $E_2$ is for transition matrix for a node performing the element functions $E_2$. Subscript 0 is for a transition matrix which is not performing any functions so that the incoming data is simply transmitted to the next node.

The table according to FIG. 3 shows the possible data path options for the logical nodes U, V, i.e. data packet traversing node U, node V or both of them. As the first element function $E_1$ has to be executed before the second element function, as the order of the element functions is important, it is not necessary for this instance to compute the capacity usage of executing the second element function $E_2$ before executing the first element function $E_1$.

It has to be noted that the capacity usage of the first element functions may depend on element functions being applied to the data before executing the first element function. Consequently, the capacity usage differs depending on the element function applied to the data prior to the respective element function. For example, the size of the data packet is influenced if a data compression algorithm is applied to the prior data. As the capacity usage also depend on the amount of data traversing the respective node, it results in different capacity usages having a compression algorithm or not prior to executing the respective element function.

Thus, the table according to FIG. 3 shows data path options for all possible data paths for the given network according to FIG. 1 and for the correct order of the first element function $E_1$ and the second element function $E_2$ to be executed. In order to determine which data path option describes the data path with the lowest capacity usage, the capacity values $C_{i(n)}$ for each of the logical nodes U, V executing none, one of the first and second element function $E_1$, $E_2$ or both element functions $E_1$, $E_2$ are given in the table according to FIG. 4.

Figure 5:
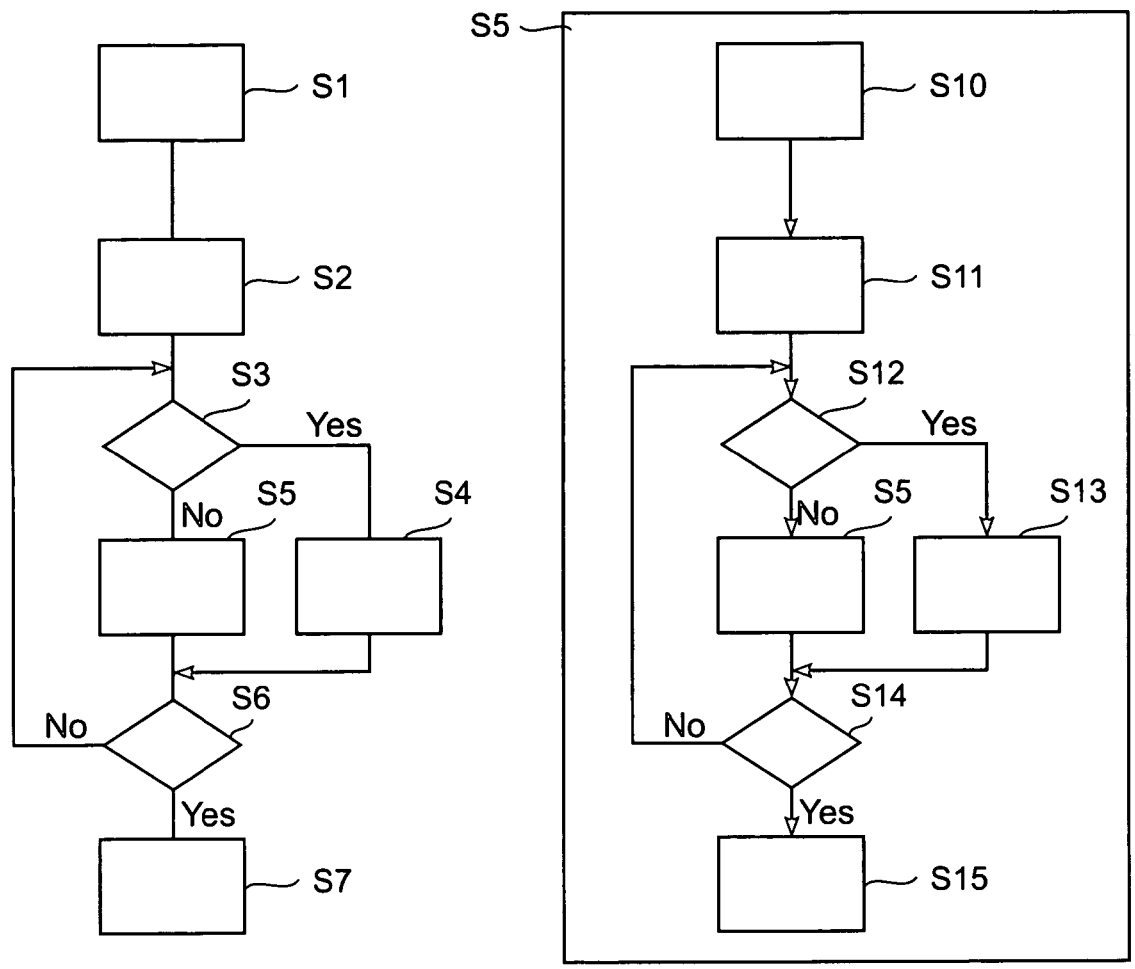
FIG. 5 shows a flow chart illustrating the method according to a advantageous embodiment of the present invention.

In the following, a summary of a method of the present invention is given with reference to the flow chart of FIG. 5. In step S2, the step of determining the data path options is indicated. The capacity values $C_{i(n)}$ which are necessary for determining the lowest capacity usage of all data path options have to be extracted from the data path options with reference to step S2 according to FIG. 5. In step S3 it is decided if the capacity values $C_{i(n)}$ are known or not. They are known if the respective node is a physical node. If they are known, the respective capacity value is provided in step S4 and the next node according to the data path options is examined. They are not known if the respective node is a logical node. Then the underlying network has to be examined in step S5. Step S5 provides capacity values $C_{i(n)}$ derived from the capacity values of the underlying physical nodes as described in the subroutine of step S5. In step S6 it is decided if all of the necessary capacity values are received. If not, the process returns to step S3. If yes, a shortest path computation can be performed to determine the optimized data path in step S7.

Step S5 describes a sub-function to determine the capacity values $C_{i(n)}$ of the underlying network. To determine a respective capacity value $C_{i(n)}$ second data path options have to be determined in step S10 which leads to a determination of the necessary capacity values of each of the nodes of the data path options regarding each of the respective element functions to be executed in the respective node according to step S11. If a capacity value can be determined because the respective node is a physical node (step S12), the capacity value is provided in step S13. If the respective node is not a physical node the sub-function according to step S5 is executed again (recursively) in order to determine the respective capacity value related to the capacity values of the physical nodes of the underlying network. In step S14, a check is performed to determine if for all of the respective nodes of the data path options and their assigned possible functions a capacity value is determined. If not, the procedure of steps S12 to S14 is repeated. If yes, the capacity value of the data path option with the lowest cost is provided as the capacity value for the next upper node of the network (step S15).

Referring back to the example, the assignment of the capacity value to the logical nodes U, V can only be performed by means of the network nodes U,V as the topology of the underlying sub-network including the physical nodes is only known by the nodes U,V. Before actual costs can be assigned to the transition matrices $T_U$, $T_V$, the procedure of determining the data path options must be repeated with the sub-network including the first to fourth physical nodes A, B, C, D. This procedure has to be repeated as often until it reaches the lowest hierarchy level. This is indicated by the sub-function of S5 which is a recursive function.

For the underlying network layer having the physical nodes for each of the determined matrices $T_{U0}$, $T_{U(E1)}$, $T_{U(E2)}$, $T_{U(E1, E2)}$, $T_{V0}$, $T_{V(E1)}$, $T_{V(E2)}$, $T_{V(E1, E2)}$, second data path options are determined regarding all possible combinations of node and element functions found out by determining the first data path options according to the table of FIG. 2. This means that for all determined node-function-pairs as $T_{U0}$, $T_{U(E1)}$, $T_{U(E2)}$, $T_{U(E1, E2)}$, $T_{V0}$, $T_{V(E1)}$, $T_{V(E2)}$, $T_{V(E1, E2)}$, possible data paths through the underlying network layer have to be determined so that the underlying physical node network can perform the requested functions.

As it is indicated in the table of FIG. 3, there are according to the data paths four different options for each logical node U, V, to perform the first and/or second element functions $E_1$, $E_2$. Provided that each of the first and second element functions $E_1$, $E_2$ can be performed in each of the physical nodes A, B, before C, D related to the logical nodes U, V, second data path options for each of the node-function-pairs are indicated in FIG. 3. For determining the data path through the physical nodes with the minimum capacity usage, capacity values $C_{i(n)}$ have to be provided.

The capacity values of the physical nodes A, B related to the specific function of the first and/or second element function $E_1$, $E_2$ is given by hardware constrain and the available system resources of the hardware. The capacity value $C_{i(n)}$ depends on the regarded element function $E_1$, $E_2$ and may depend for example on the free memory, on the processing speed of the microprocessor of the physical node and on factors provided by a coprocessor and/or an acceleration hardware for specific element functions. Also, the capacity value can depend on the amount of data packets and/or the size of the data packets to be executed.

Given the capacity values $C_{i(n)}$ for each of the specific physical node A, B, C, D and all of the relevant combinations of the element functions $E_1$, $E_2$, a second overall capacity usage can be calculated e.g. by simply adding the capacity values for each sub-node A, B the data is transmitted to according to the data path through the physical nodes. For all of the transition matrices T related to a specific logical node and specific element functions $E_1$, $E_2$ and/or combinations of element functions $E_1$, $E_2$, the minimum overall capacity value is calculated by comparing the overall capacity usages of the second data path options.

The calculated minimum overall capacity values are now used as the first capacity values related to the logical nodes U, V and the related first and/or second element functions $E_1$, $E_2$, respectively. These second overall capacity usage are used in order to determine the first overall capacity values for all data path options as shown in the table of FIG. 2. The first data path option having the lowest capacity usage value then indicates the optimized data path for executing the service on the given data at the start node X. The calculation of the first or second overall capacity value can also be performed by the Dijkstra shortest path computation.

The described method for forwarding a data packet through a network is not limited to hierarchical networks including two layers but is also useful for hierarchical networks having more than two network layers. The determination of the data-path-options-computation is then performed for each node-function-pair of the determined data path options resulted from the preceding computation. As a result, another data path option concerning the nodes of the underlying network layer are provided. This is repeated until the lowest network layer, normally the physical network layer, is reached. From thereon the capacity values given at the physical node as described above are used to find the preferred data path option having the lowest capacity usage for each of the node-function-pairs given by the data path option of the upper next network layer. Then the capacity usage of the preferred data path option is used as the capacity value of the node-function-pair given by the data path option of the network layer immediately above. This is repeated until the top network layer is reached, wherein for each logical node of the top network layer a capacity value is given which is the minimum overall capacity value of the data path options of the network layer situated immediately underneath. These capacity values for each node-function-pairs of the top network layer can then be used to determine the shortest data path through the network.

The method for forwarding the data through the network according to the present invention and for optimizing the capacity usage of the network can be performed by a router device which controls the flow of the data through the whole network from the start node X to the end node Y. For instance, such a network can be a ATM network where the data path is set up first and then data is transmitted through the established data path.

According to an example embodiment of a method of the present invention, the router device must have knowledge of the capacity values of all logical nodes of the same hierarchy level to optimize the flow of the data from the physical nodes of the network. The router device optimizes the capacity usage of the whole network according to the present invention by determining the data path options for the first network layer including logical nodes. As a result for each node a set of transition matrices is provided which can be used for transmitting data through the network. Each of the transition matrices determines which function(s) may be associated to the respective logical node. To find out the shortest path through the network nodes the capacity usage for performing each of the associated function has to be provided to the router device. The router device sends out a request to each of the logical network nodes of the same hierarchy layer of the network. Each of the network nodes which have received such a request for providing capacity values related to the set of functions now starts to perform a method to determine the requested capacity values. As each of the logical nodes has the knowledge of their underlying network layers including their subnodes such a request can be performed in the above described manner by determining the data path options for the underlying network layer, requesting the respective capacity values and determining the minimum overall capacity value for each of the possible functions.

If the physical network nodes of bottom-most network layer are requested to provide capacity values for the respective functions capacity values depending on how effective the respective physical node can handle the respective function(s) which is dependent on the hardware and/or software equipment as well as on the performance of the microprocessor and memory of the physical node computer.

Once the bottom-most layer of the network is reached the capacity values are used to determine the data path having the lowest capacity usage indicated by a minimum overall capacity value. These results are forwarded to the upper-next network layer until the network layer of the start node is reached. So capacity values can be delivered by the logical nodes to the router device which are dependent on physical parameters of the underlying hardware.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a non-transitory computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a non-transitory computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising optimizing a data path and forwarding data from a start node to an end node over a hierarchical network, wherein the hierarchical network comprises first nodes, on a first layer of the hierarchical network, each first node for performing one or more first node functions, wherein one or more of said first node functions are to be applied on said data while forwarding said data through the hierarchical network, wherein a number of data path options through the first nodes are determined, for each data path option, the first nodes, having one or more assigned first node functions, wherein a first capacity value for each of said first nodes and for each of said first node functions and/or combinations of said first node functions are provided; and wherein the data is forwarded through the data path which is determined by the data path option having a minimum overall capacity regarding the first capacity values; characterized in that said one or more of said first nodes comprises a logical node comprising a hierarchical sub-network having one or more second physical nodes on lower layers of the hierarchical sub-network, the second physical nodes unknown to the start node, each of the second physical nodes assigned to one of the first logical nodes for performing one or more second node functions, wherein said first node functions of the first nodes are provided by said second node functions, wherein providing one of said first capacity values for one specific first node and for one specific first node function or one specific combination of said first node functions, including file following steps: determining a number of second data path options for the second physical nodes of the one specific first node to perform said one specific first node function, for each second data path option, the second physical nodes having one or more assigned second node functions, providing second capacity values for each of said second physical nodes and for each of said assigned second node functions; determining the overall capacity values of said second data path options with regard to the second capacity values; determining the minimum overall capacity value of any of said second data path options; and providing the minimum overall capacity value as the first capacity value.

2. A method according to claim 1, wherein the second nodes are physical nodes wherein the second capacity values depending on a data processing speed, a data handling speed an/or a buffering capacity related to the assigned second node functions.

3. A router device for determining a data path from a start node to an end node over a hierarchical network, wherein the hierarchical network comprises first nodes on a first layer of the hierarchical network, each for performing one or more first node functions, wherein one or more of said first node functions are to be applied on said data while forwarding said data through the hierarchical network, said one or more of said first nodes comprising a logical node including a hierarchical sub-network having one or more second physical nodes on lower layers of the hierarchical network, the second physical nodes unknown to the start node, each of the second physical nodes assigned to one of the first logical nodes for performing one or more second node functions, wherein said first node functions of the first logical nodes are provided by said one or more second node functions, the router comprising: a first data path determining means to determine a number of data path options through the first logical nodes for each data path option, the first logical nodes having one or more assigned first node functions, a first means for determining the minimum overall capacity value of any of said first data path options regarding first capacity values for each of said first logical nodes and for each of said first node functions or combinations of said first node functions; receiving means for receiving said first capacity values for each of said first logical nodes and for each of said first node functions and/or combinations of said first node functions.

4. A router device according to claim 3 further comprising sending a request for first capacity values for each of said first logical nodes and for each of said first node functions and/or combinations of said first node functions to each of said first logical nodes.

5. A network node amongst a plurality of network nodes of a hierarchical communications network, said network node comprising: a hierarchical sub-network having one or more physical sub-nodes on a lower layer of the hierarchical network, the physical subnodes being unknown to a start node on a first layer of said hierarchical communications network, each physical subnode for executing at least one function, wherein a subnode capacity value is assigned to each subnode and to each function related to the respective physical subnode, a request receiving means to receive a request for providing overall capacity values related to a set of at least one specific function to be executed by the network node, a data path determining means to determine a number of data path options for each of the functions of the set of at least one specific function to be executed by the network node, capacity determining means to determine an overall capacity value for each of the data path options and for each of the functions of said set of at least one specific function to be performed in the network node, wherein said overall capacity values of each data path option are determined with regard to said subnode capacity values provided for each of said physical subnodes and for each of said assigned specific functions; and transmitting means for a minimum overall capacity value for each of the specific functions of the set of one or more specific functions and for file assigned data path option as the requested overall capacity value.

6. An apparatus comprising means for optimizing a data path and means for forwarding data from a start node to an end node over a hierarchical network, wherein the hierarchical network comprises first nodes on a first layer of the hierarchical network, each first node for performing one or more first node functions, wherein one or more of said first node functions are to be applied on said data while forwarding said data through the hierarchical network, wherein a number of data path options through the first nodes are determined, for each data path option, the first nodes, having one or more assigned first node functions, wherein a first capacity value for each of said first nodes and for each of said first node functions or combinations of said first node functions are provided; and wherein the data is forwarded through the data path which is determined by the data path option having a minimum overall capacity regarding the first capacity values; characterized in that said one or more of said first nodes comprises a logical node comprising a hierarchical sub-network having one or more second physical nodes on lower layers of the hierarchical network, the second physical nodes unknown to the start node, each of the second physical nodes assigned to one of the first logical nodes for performing one or more second node functions, wherein said first node functions of the first nodes are provided by said second node functions, wherein providing one of said first capacity values for one specific first node and for one specific first node function or one specific combination of said first node functions, comprising: means for determining a number of second data path options for the second nodes of the one specific first node to perform said one specific first node function, for each second data path option, the second nodes having one or more assigned second node functions, means for providing second capacity values for each of said second nodes and for each of said assigned second node functions; means for determining the overall capacity values of said second data path options with regard to the second capacity values; means for determining the minimum overall capacity value of any of said second data path options; and means for providing the minimum overall capacity value as the first capacity value.

7. A computer program product including a non-transitory computer-readable storage medium having computer program instructions in which when executed on a computer instructs the computer to: optimizing a data path and forwarding data from a start node to an end node over a hierarchical network, wherein the hierarchical network comprises first nodes, on a first layer of the hierarchical network, each first node for performing one or more first node functions, wherein one or more of said first node functions are to be applied on said data while forwarding said data through the hierarchical network, wherein a number of data path options through the first nodes are determined, for each data path option, the first nodes, having one or more assigned first node functions, wherein a first capacity value for each of said first nodes and for each of said first node functions or combinations of said first node functions are provided; and wherein the data is forwarded through the data path which is determined by the data path option having a minimum overall capacity regarding the first capacity values; characterized in that said one or more of said first nodes comprises a logical node comprising a hierarchical sub-network having one or more second physical nodes on lower layers of the hierarchical sub-network, the second physical nodes unknown to the start node, each of the second physical nodes assigned to one of the first logical nodes for performing one or more second node functions, wherein said first node functions of the first nodes are provided by said second node functions, wherein providing one of said first capacity values for one specific first node and for one specific first node function or one specific combination of said first node functions, including file following steps: determining a number of second data path options for the second physical nodes of the one specific first node to perform said one specific first node function, for each second data path option, the second physical nodes having one or more assigned second node functions, providing second capacity values for each of said second physical nodes and for each of said assigned second node functions; determining the overall capacity values of said second data path options with regard to the second capacity values; determining the minimum overall capacity value of any of said second data path options; and providing the minimum overall capacity value as the first capacity value.

8. A computer program product as in claim 7, wherein the second nodes are physical nodes wherein the second capacity values depending on a data processing speed, a data handling speed or a buffering capacity related to the assigned second node functions.

* * * * *